United States Patent [19]

Goetzke et al.

[11] Patent Number: 5,163,816
[45] Date of Patent: Nov. 17, 1992

[54] WHEEL LOCK, CENTERING AND DRIVE MEANS AND TURBOCHARGER IMPELLER COMBINATION

[75] Inventors: Michael B. Goetzke, Orland Park; Paul Cottemoller, Palos Park; Edward J. Cryer, III, Lockport, all of Ill.

[73] Assignee: General Motors Corporation, Detroit, Mich.

[21] Appl. No.: 729,260

[22] Filed: Jul. 12, 1991

[51] Int. Cl.⁵ .............................................. F01D 5/26
[52] U.S. Cl. ........................... 416/204 A; 416/244 A; 403/2; 403/259; 403/261; 403/356; 403/359
[58] Field of Search ............... 416/144, 204 R, 204 A, 416/244 R, 244 A, 244 B, 245 R, 245 A, 245 B; 403/259, 261, 359, 365, 383, 356, 2

[56] References Cited

U.S. PATENT DOCUMENTS

| 1,358,430 | 11/1920 | Faehrmann | 416/144 |
|---|---|---|---|
| 1,496,319 | 6/1924 | MacDonald | 403/259 |
| 1,920,880 | 8/1933 | Parker | 416/245 A |
| 2,960,939 | 11/1960 | Buschhorn et al. | 416/244 A |
| 3,061,342 | 10/1962 | Feller | 416/244 B |
| 4,719,818 | 1/1988 | McCreary | |
| 4,915,589 | 4/1990 | Gessler et al. | 416/244 A |

FOREIGN PATENT DOCUMENTS

| 0435822 | 10/1926 | Fed. Rep. of Germany | 416/244 A |
|---|---|---|---|
| 2302251 | 8/1973 | Fed. Rep. of Germany | 416/144 |
| 0309159 | 9/1971 | U.S.S.R. | 416/245 A |
| 0522166 | 6/1940 | United Kingdom | 416/245 A |

Primary Examiner—Edward K. Look
Assistant Examiner—Christopher M. Verdier
Attorney, Agent, or Firm—Robert J. Outland

[57] ABSTRACT

A turbocharger impeller has a lock ring that is flexed in assembly to clampingly center and lock an impeller wheel on its drive shaft. The lock ring is also applicable to other driving or driven shaft and wheel combinations. The lock ring is made part of a two-piece spacer for the illustrated rotor applications but is not limited to that arrangement. Alternative impeller wheel structures including drive means and locking nose cone features are included.

27 Claims, 4 Drawing Sheets

WHEEL LOCK, CENTERING AND DRIVE MEANS AND TURBOCHARGER IMPELLER COMBINATION

TECHNICAL FIELD

This invention relates to shaft mounted impellers as well as to other shaft driven and driving wheels, especially for high speed applications where balancing of rotating forces is of importance. In a particular embodiment, the invention relates to aerodynamic compressor impeller wheels for engine turbochargers and the like and their retention on and driving relation with supporting drive shafts.

BACKGROUND

In an engine turbocharger, for example, of the type shown in U.S. Pat. No. 4,719,818 for use on a turbocharged two stroke cycle medium speed diesel engine, particularly of the railway locomotive type, a rotor is provided including a stubshaft with integral drive gear, a turbine shaft with integral turbine wheel (which may have detachable blades) and a compressor impeller wheel drivingly attached to an end of the turbine shaft to be driven thereby at high speeds. This arrangement is only one example of numerous applications of shaft driven wheels wherein a wheel is detachably mounted to a drive shaft for high speed rotation requiring balancing of the assembly and wherein retention of the balanced condition upon detachment and reassembly is of importance.

In prior arrangements similar to U.S. Pat. No. 4,719,818, an impeller wheel, made of aluminum for light weight, is formed on a steel sleeve having internal splines. The splines are engaged with a close fit with mating splines at the end of a turbine shaft which drives the impeller wheel. The wheel is held in a fixed position on the shaft by a nut engaging a washer that forces the splined sleeve against an annular spacer which in turn is forced against a shoulder on the turbine shaft or drive shaft.

The turbine shaft and stubshaft assembly (rotor) is rotatably supported upon installation in a turbocharger on bearings engaging bearing journals between the impeller wheel and turbine wheel and between the turbine wheel and the stubshaft gear.

Prior to installation, the rotatable assembly (rotor) is assembled and dynamically balanced by adding or removing weight from selected portions of the rotor as required. However, when the rotor is again disassembled for installation in the turbocharger or, later, for inspection or service of the rotor on its bearings, the reassembly of the components may result in a substantial change in the balance of the assembly. This is thought to occur as a result of the necessary clearance between the splines of the drive shaft and sleeve which allows for some movement of the impeller wheel on the shaft prior to tightening of the nut, with the result that the impeller may be assembled in a slightly displaced position on the shaft each time it is reassembled. For this and other reasons, improved means for centering and retaining the impeller wheel on the drive shaft were desired.

SUMMARY OF THE INVENTION

The present invention provides novel shaft wheel clamp means in part comprising a new two piece spacer having a resiliently deformable lock ring that permits the wheel to be assembled loosely on the shaft and then, upon assembly, deforms to center and clamp the end of the wheel in engagement with the spacer in a fixed concentric position on the shaft.

The improved design requires provision on the impeller of an annular protrusion to be engaged by the lock ring. The protrusion is preferably provided with limited radial resilience to limit clamping stresses on the impeller. The protrusion may optionally be formed as a reduced thickness extension of a splined sleeve modified from that used in the prior art compressor impeller wheel. Alternatively, the protrusion may be formed as an integral part of an impeller wheel.

In another feature, an impeller wheel may be formed of titanium, or another material of desired strength and weight and a full length drive sleeve may not be required. An insert may then be received in the outboard end of the impeller wheel to loosely drivingly engage mating polygonal flats with the centering of the inboard wheel portion being accomplished entirely or primarily by the lock ring. The splined insert may be doweled to the impeller wheel body. The wheel is retained by a nut threaded onto the end of the drive shaft.

A nose cone may be provided to cover the nut and streamline the compressor inlet flow. The nose cone may be threaded directly to drive shaft and locked in place by a screw threaded into the end of the drive shaft. The screw is preferably provided with a finer thread (i.e. more threads per unit of length) than the thread on the shaft. This prevents the nose cone from backing out of its position on the shaft since, even if the nose cone and screw would tend to turn together, the differing leads on the thread will lock up the members to prevent their rotation.

These and other features of the invention will be more fully understood from the following description taken together with the accompanying drawings.

BRIEF DRAWING DESCRIPTION

DETAILED DESCRIPTION

Figure 1:
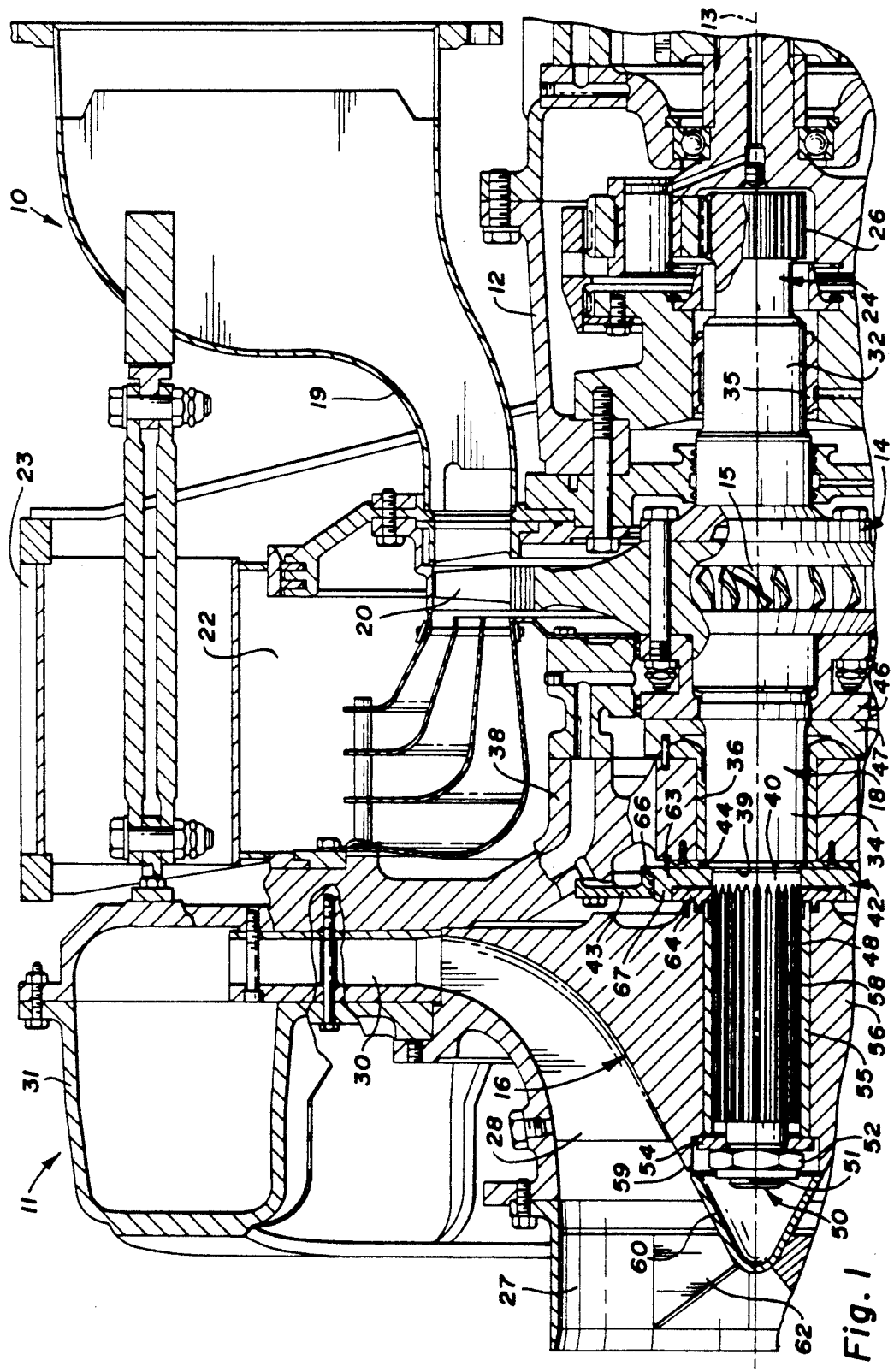
FIG. 1 is a cross-sectional view of pertinent portions of a turbocharger assembly having wheel lock means according to the invention.

Referring now to FIGS. 1-4 of the drawings in detail, numeral 10 generally indicates a turbocharged two stroke cycle medium speed diesel engine, particularly of the railway locomotive type previously referred to. The engine 10 has a fabricated crankcase, not shown, at the rear of which there is mounted a gear and exhaust gas driven turbocharger generally indicated by numeral 11.

The turbocharger 11 includes a housing 12 supporting, on an axis 13, a rotor 14 that includes a turbine wheel 15 and a compressor impeller wheel 16 mounted on a common shaft 18 that is preferably made integral with the turbine wheel. The turbine wheel 15 is driven by exhaust gases discharged from the engine cylinders, not shown, and directed through an inlet duct and scroll 19 against blades 20 on the turbine wheel, where a portion of the exhaust energy is utilized for turning the rotor. The exhaust gases are then received in a collector chamber 22 and discharged through an exhaust duct 23.

The rotor 14 further includes a drive shaft 24 fixed to the turbine wheel 15 at one end and having a sun gear 26 at its other end that is part of a planetary gear set in a gear train for driving the rotor when the exhaust energy is insufficient for the purpose. Further description of a gear train similar to that shown may be found in the aforementioned U.S. Pat. No. 4,719,818.

Rotation of the rotor 14 turns the compressor wheel 16, drawing in ambient air through an inlet duct 27 to rotating blades 28 on the compressor wheel, where the air is compressed. The compressed inlet air is then discharged through a diffuser 30 to an outlet scroll 31 from which it is carried by duct means, not shown, to the engine cylinders. The rotor 14 is rotatable on a pair of bearing journals 32, 34, located on opposite sides of the turbine wheel, between it and the overhung sun gear 26 and compressor wheel 16, respectively. The journals are respectively carried in a gear end bearing 35 and a compressor sleeve bearing 36. Bearing 36 is supported in a compressor bearing support member 38 which is a separate part of the housing 12 and also forms a portion of the inlet scroll 19.

Adjacent the journal 34, the shaft 18 has a shoulder 39 connecting with a reduced diameter mounting portion 40 on which the impeller wheel 16 is mounted. A two-piece spacer 42, forming a primary element of the present invention, is clamped between the wheel 16 and the shoulder 39. In addition to the novel features to be later described, the spacer 42 coacts with an oil seal housing 43 and also bears against an anti-thrust washer 44 that is fixed to the support member 38. Motion in the primary direction of thrust (leftward) is prevented by a rotor carried thrust flange 46 that bears against a thrust bearing 47. In these respects, the spacer 42 is similar to the one piece spacer used in prior arrangements such as that of U.S. Pat. No. 4,719,818.

The shaft mounting portion 40 includes external splines 48 extending from near the shoulder 39 to a reduced diameter portion adjacent the distal end 50 of the shaft on which axially centered threads 51 are provided for receiving a retaining nut 52. The nut engages a washer 54, the nut and washer together comprising retaining means engaging a tubular steel insert 55 pressed within an aluminum body 56 of the impeller wheel 16. The insert is forced against the spacer 42 for retaining the wheel 16 on the shaft. The insert 55 is provided with internal splines 58 which are closely mated with the external splines 48 to comprise drive means connecting the wheel 16 and shaft 18. The nose portion 59 of the wheel, adjacent the nut 52, is covered by a fixed nose cone 60 supported in the inlet duct 27 by suitable means, such as struts 62.

Figure 2:
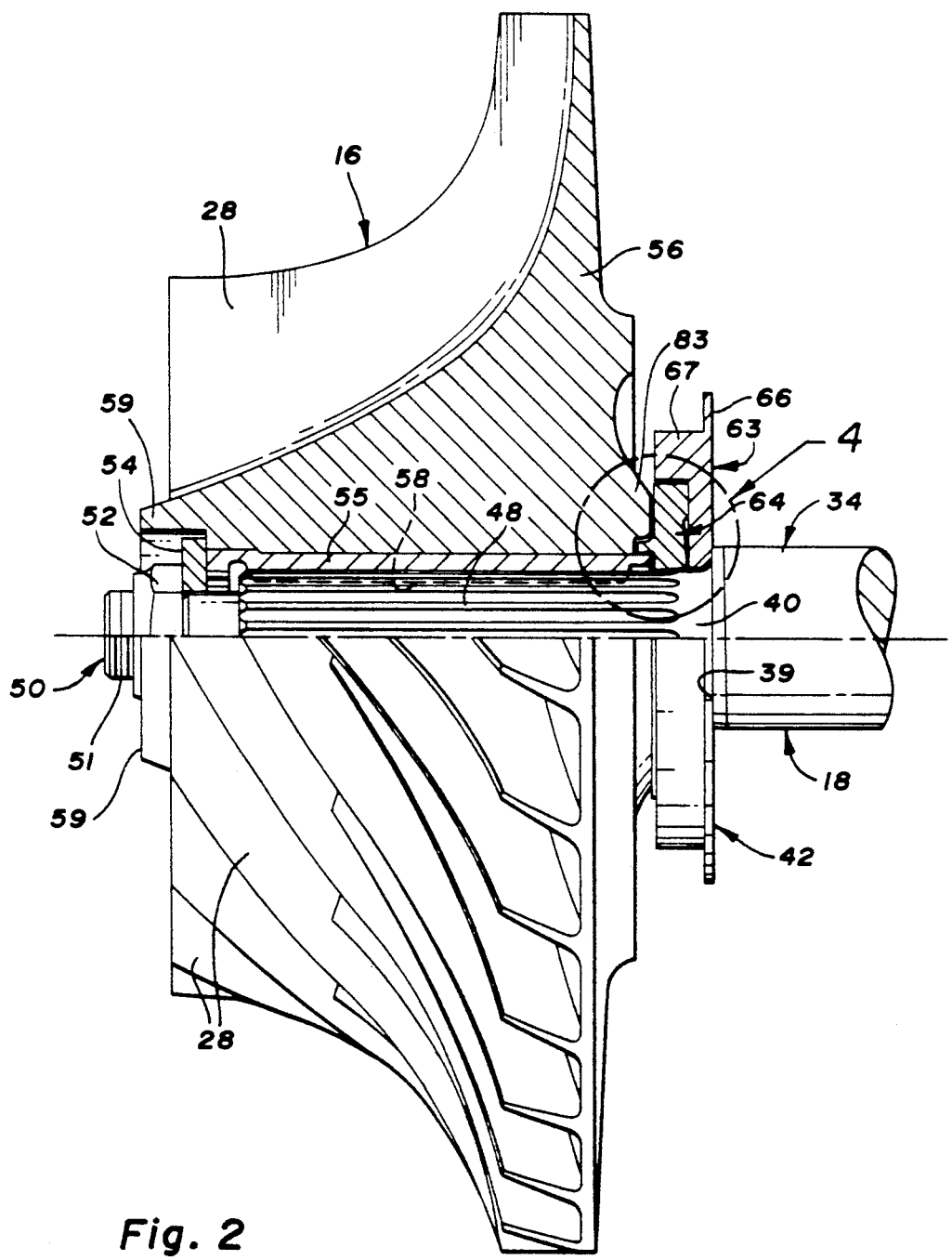
FIG. 2 is a cross-sectional view of the compressor impeller wheel portion of the rotor assembly of FIG. 1.
Figure 3:
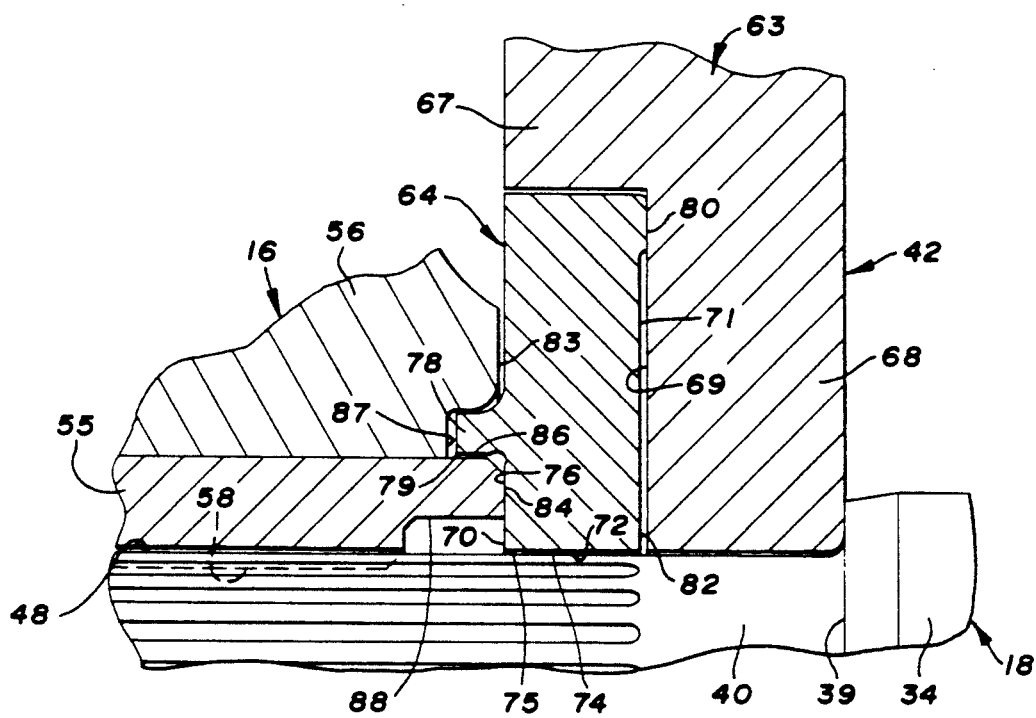
FIG. 3 is an enlarged cross-sectional view of the circled portion 4 of FIG. 2 but showing the lock means prior to tightening of the compressor wheel retaining nut.
Figure 4:
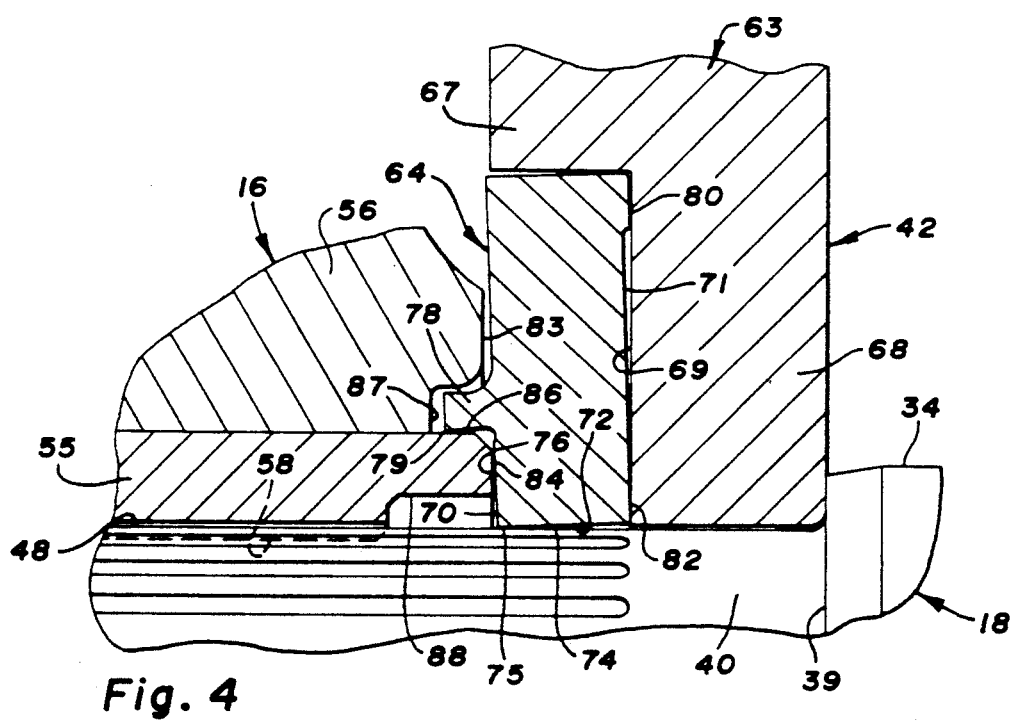
FIG. 4 is an enlarged cross-sectional view of the circled portion 4 of the rotor assembly of FIG. 1 showing the lock means after tightening of the compressor wheel retaining nut.

As is shown best in FIGS. 2–4, two-piece spacer 42 includes both an annular flange member 63 and an annular lock ring 64. The flange member has an L-shaped cross section with an outer lip 66 that acts as an oil slinger. Adjacent the lip 66, an axially wider portion 67 of the flange member coacts with the seal housing 43 while a narrower inner portion 68 engages the shoulder 39 and acts as the anti-thrust flange. These functions were previously performed by the prior one-piece spacer.

The annular lock ring 64 is disposed in a recess of the flange member between an annular face 69 of the flange inner portion 68 and the impeller wheel 16. The lock ring includes axially spaced first and second end faces 70, 71 and a central opening 72 between the end faces. The opening 72 is defined by an inner surface 74 having a first clamping portion 75 adjacent the first end face 70. The first end face 70 has an axially facing wheel contact surface 76 near the central opening and an annular protrusion 78 outwardly adjacent the wheel contact surface. The protrusion has an inwardly facing annular surface defining a second clamping portion 79. If desired, the protrusion and its clamping portion 79 could be a series of annularly spaced elements rather than a complete annulus and these variations should be considered equivalent. The second end face 71 has a first flange contact surface 80 spaced radially outward from the first and second wheel contact surface clamping portions and a second flange contact surface 82 spaced radially inward from the first flange contact surface.

At its hub end 83, adjacent the lock ring, the impeller wheel has on the insert 55 an axial end surface 84 and an adjacent outwardly facing peripheral surface 86. An annular recess 87 in the aluminum body surrounds the surface 86 to receive the lock ring protrusion 78. Also, the inner portion of the insert 55 may be cut away as at 88 to provide a suitable degree of resilience of the locking end.

In assembly, the lock ring 64 is disposed with the inner surface 74 surrounding the shaft mounting portion 40, the first flange contact surface 80 engaging the flange member face 69 and the wheel contact surface 76 engaging the axial end surface 84 of the wheel insert.

After assembly but, as shown in FIG. 3, prior to tightening of the retaining nut fastener 52, the first and second clamping portions 75, 79 are closely radially spaced from the mounting portion 40 of the shaft and the peripheral surface 86 of the wheel insert, respectively, and the second flange contact surface 82 has a predetermined clearance from the flange member face 69.

Upon tightening of the nut 52, the lock ring 64 is flexed, as shown in FIG. 4, to cause the second flange contact surface 82 to close the predetermined clearance and move into engagement with the flange member face 69, such flexing causing the first and second clamping portions, 75, 79 to clampingly engage the mounting portion 40 of the shaft and the peripheral surface 86 of the wheel, respectively, thereby centering and locking the wheel end surface 84 in a fixed position on the shaft.

After assembly, the rotor 14 is balanced by adding or removing weight in known fashion and the parts are marked to show their relative assembled positions. Thereafter, the compressor impeller wheel 16 and the spacer 42 are removed and reassembled in their balanced positions after installation in the turbocharger housing, whereupon tightening of the retaining nut fastener 52 again flexes the lock ring clamping portions 75, 79 into engagement with the respective shaft and wheel surfaces and returns the parts to substantially their original positions so that the parts are securely locked and centered and the original balance condition is restored.

ALTERNATIVE EMBODIMENT

Figure 5:
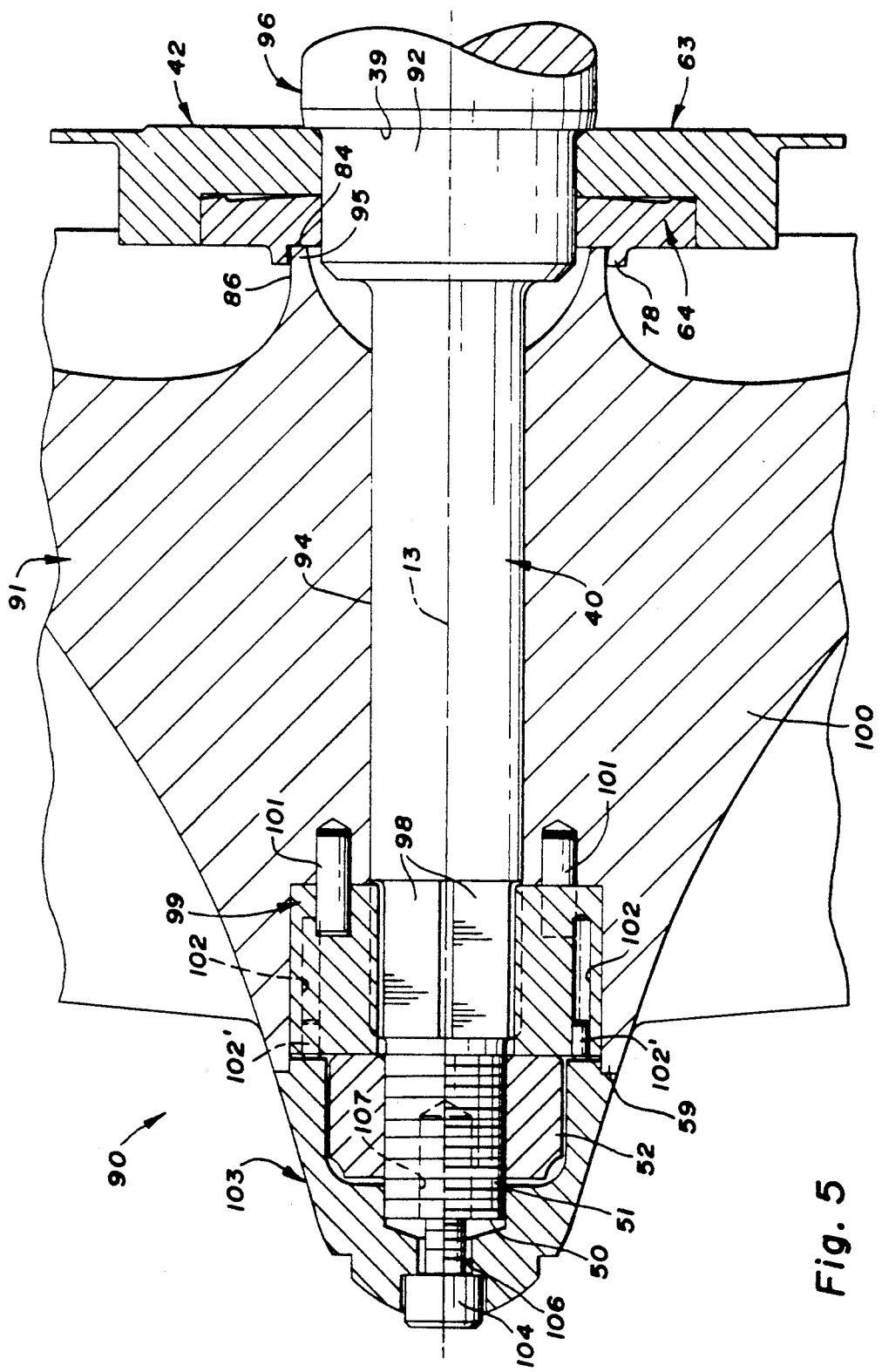
FIG. 5 is a cross-sectional view of an alternative embodiment of rotor assembly having lock means according to the invention.

FIG. 5 illustrates an alternative embodiment of turbocharger rotor 90 with novel features according to the invention. Since many of the features of this embodiment are not significantly changed from that of FIGS. 1-4, like numerals are used for comparable parts which will not again be described.

Among the significant differences is the structure of the impeller wheel 91 which at present, is preferably formed of titanium to minimize thermal growth differences. This helps balance stresses between the impeller and the two piece spacer 42 to avoid yielding of either component and to prevent loosening under all operating conditions. However, other materials, such as aluminum, ceramics and steel as well as materials of intermediate strength and mass may alternatively be used as appropriate. The wheel 91 does not include a full length insert so the shaft mounting portion 40 may be of stepped diameter with the two-piece spacer 42 fixed on a larger diameter 92 while the wheel 91 is carried on a smaller diameter 94 of the mounting portion 40.

The spacer 42 is placed on the larger diameter 92 against the shoulder 39 to mate with an annular (or interrupted multiple) hub end portion 95 that is formed directly in the titanium (or other) material of the wheel. The end portion 95 has an axial end surface 84 and outwardly facing peripheral surface 86 which coact with the lock ring 64 of the spacer 42 to center and lock the wheel in the manner previously described. In addition, the diameters of the end portion 95 and the mating protrusion 78 of the lock ring are made larger to act as a base for centering the entire wheel 91 on the modified common shaft 96.

Thus the wheel 91 can be mounted relatively loosely on the shaft 96 and driven by hexagonal (polygonal) flats 98 or other suitable means formed on the shaft near the distal end 50 and received in a short insert 99 having a mating polygonal (or other) recess. The insert may be steel or other suitable material and be drivingly connected in the nose portion 59 with the titanium (or other material) body 100 of the wheel by shear pins 101 that shear to allow the wheel to slip on the shaft if necessary to avoid accidental overstress. The insert may also include a plurality of blind holes 102 opening to the outer end of the insert. The holes 102 may be selectively filled as by weights (not shown) retained by plugs 102' as may be necessary in balancing the rotor. Use of the drive insert 99 provides a compact nose configuration that allows a smaller diameter hub in the entry (inducer) portion of the impeller wheel adjacent the nut 52, thus providing for a more open flow area than first described embodiment.

In another feature, the retaining nut 52 may be covered by a rotating nose cone 103 that is threaded on the fastener threads 51 provided on the shaft end. The nose cone or cap is locked in place by a screw 104 extending axially through an end opening 106 into a threaded axial hole 107 in the end 50 of the shaft 96. The threads on the screw 104 are finer (have more threads per unit of length) than those threads 51 on the shaft so that the cone 103 is prevented from backing off of the shaft threads 51 by the locking action of the screw threads.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A drive assembly including a wheel and a shaft secured together in driving relation on a common axis, the wheel having a first end and an axial opening extending from the end, the shaft having a flange and an end portion extending into the opening from the first end, the assembly having retaining means for axially forcing the wheel first end toward the flange, and the improvement comprising a resiliently deformable lock ring having axially spaced first and second end faces and a central opening between the end faces, the opening being defined by an inner surface, the inner surface having a first clamping portion adjacent the first end face, the first end face having an axially facing wheel contact surface near the central opening and a protrusion outwardly adjacent the wheel contact surface, the protrusion having an inwardly facing surface defining a second clamping portion, and the second end face having a first flange contact surface spaced radially outward from the wheel contact surface and a second flange contact surface spaced radially inward from the first flange contact surface, and the wheel having at the first end an axial end surface and an adjacent outwardly facing radial surface, the lock ring being disposed on the shaft between the flange and the wheel with the inner surface surrounding the shaft end portion, the first flange contact surface engaging the flange and the wheel contact surface engaging the axial end surface of the wheel, wherein, prior to tightening of the retaining means, the first and second clamping portions are closely spaced from the end portion of the shaft and the radial surface of the wheel, respectively, and the second flange contact surface has a predetermined clearance from the flange, and upon tightening of the retaining means, the lock ring is flexed to cause the second flange contact surface to close the predetermined clearance and move into engagement with the flange, such flexing causing the first and second clamping portions to clampingly engage the end portion of the shaft and the radial surface of the wheel, respectively, thereby locking the wheel first end in a fixed position on the shaft.

2. The invention as in claim 1 wherein the drive assembly is a rotor.

3. A turbocharger rotor having a shaft with an end, a shoulder spaced from the end and a mounting portion between the shoulder and the end, a wheel mounted on the shaft mounting portion, a fastener on the shaft end and engaging the wheel to retain it on the shaft, and a spacer on the shaft clamped between and engaging the wheel and the shoulder, wherein the improvement comprises the spacer comprising an annular flange member and an annular lock ring, the flange member engaging the shoulder and the lock ring being clamped between the wheel and the flange member, the lock ring having axially spaced first and second end faces and a central opening between the end faces, the opening being defined by an inner surface having a first clamping portion adjacent the first end face, the first end face having an axially facing wheel contact surface near the central opening and a protrusion outwardly adjacent the wheel contact surface, the protrusion having an inwardly facing surface defining a second clamping portion, and the second end face having a first flange contact surface spaced radially outward from the wheel contact surface and a second flange contact surface spaced radially inward from the first flange contact surface, and the wheel having an axial end surface and an adjacent outwardly facing peripheral surface, the lock ring being disposed with the inner surface surrounding the shaft mounting portion, the first flange contact surface engaging the flange member and the wheel contact surface engaging the axial end surface of the wheel, wherein, prior to tightening of the fastener, the first and second clamping portions are closely radially spaced from the mounting portion of the shaft and the peripheral surface of the wheel, respectively, and the second flange contact surface has a predetermined clearance from the flange member, and upon tightening of the fastener, the lock ring is flexed to cause the second flange contact surface to close the predetermined clearance and move into engagement with the flange member, such flexing causing the first and second clamping portions to clampingly engage the mounting portion of the shaft and the peripheral surface of the wheel, respectively, thereby locking the wheel end surface in a fixed position on the shaft.

4. A rotor as in claim 3 wherein the fastener is retained by axially centered threads on the shaft and engages a tapered nose portion of the wheel, the rotor further including a nose cone mounted on the nose portion of the wheel and covering the fastener, and the further improvement of the nose cone having internal threads received on the shaft threads to retain the nose cone on the rotor, and a screw retained in a threaded axial opening in the shaft end and engaging the nose cone, the screw having a finer thread than the shaft to lock the nose cone against loosening rotation and prevent removal of the nose cone without first loosening the screw.

5. A rotor as in claim 3 wherein the lock ring protrusion is annular and the wheel axial end surface and outwardly facing peripheral surface are disposed on an annular portion mating with the lock ring protrusion.

6. A rotor as in claim 3 wherein the wheel includes drive means engaging mating drive means on the shaft for rotating the wheel and shaft together.

7. A rotor as in claim 6 wherein the drive means are mating splines, the wheel comprising an aluminum body having a tubular steel insert including a set of the splines, the insert incorporating the axial end surface and outwardly facing peripheral surface of the wheel and the fastener operatively engaging the insert and forcing the axial end surface against the wheel contact surface of the lock ring.

8. A rotor as in claim 6 wherein the wheel comprises a non-ferrous body having a ferrous insert fixed on an end adjacent the fastener and distal from the axial end surface, the insert including the wheel drive means and the mating drive means of the shaft being adjacent the distal end.

9. A rotor as in claim 8 wherein the wheel is loosely fitted on the shaft mounting portion and is positioned thereon primarily by engagement of the axial end surface with the wheel contact surface of the lock ring and clamping of the lock ring first clamping portion on the shaft and the second clamping portion on the peripheral surface of the wheel.

10. A rotor as in claim 9 wherein the drive means are mating polygons.

11. A rotor as in claim 8 wherein the ferrous insert is drivingly secured to the non-ferrous body by shear pins sized to shear and allow relative rotation of the wheel on the shaft prior to reaching a wheel torque sufficient to yieldingly deform the shaft.

12. A rotor as in claim 11 wherein the non-ferrous body is titanium.

13. A lock ring for use in a drive assembly having a shaft with an end, a flange spaced from the end and a mounting portion between the flange and the end, a wheel mounted on the shaft mounting portion, the wheel having an axial end surface and an adjacent outwardly facing peripheral surface, retaining means on the shaft end and engaging the wheel to retain it on the shaft, said lock ring being adapted to be clamped between and engaging the wheel axial end surface and the flange, the lock ring comprising a substantially non-compressible resilient annular body having axially spaced first and second end faces and a central opening between the end faces, the opening being defined by an inner surface having a first clamping portion adjacent the first end face, the first end face having an axially facing wheel contact surface near the central opening and a protrusion outwardly adjacent the wheel contact surface, the protrusion having an inwardly facing surface defining a second clamping portion, and the second end face having a first flange contact surface spaced radially outward from the wheel contact surface and a second flange contact surface spaced radially inward from the first flange contact surface, the lock ring being adapted to be disposed with the inner surface surrounding the shaft mounting portion, the first flange contact surface engaging the flange member and the wheel contact surface engaging the axial end surface of the wheel, whereby, prior to tightening of the retaining means, the first and second clamping portions are closely radially spaced from the mounting portion of the shaft and the peripheral surface of the wheel, respectively, and the second flange contact surface has a predetermined clearance from the flange, and upon tightening of the fastener, the lock ring is flexed to cause the second flange contact surface to close the predetermined clearance and move into engagement with the flange, such flexing causing the first and second clamping portions to clampingly engage the mounting portion of the shaft and the peripheral surface of the wheel, respectively, thereby locking the wheel end surface in a fixed position on the shaft.

14. A lock ring as in claim 13 wherein the lock ring protrusion is annular.

15. A turbocharger impeller wheel for use in a turbocharger having a shaft with an end, a shoulder spaced from the end and a mounting portion between the shoulder and the end, the wheel adapted to be mounted on the shaft mounting portion with a fastener on the shaft end and engaging the wheel to retain it on the shaft, and a spacer on the shaft clamped between and engaging the wheel and the shoulder, the spacer comprising an annular flange member and an annular lock ring, the flange member engaging the shoulder and the lock ring being clamped between the wheel and the flange member, the lock ring having axially spaced first and second end faces and a central opening between the end faces, the opening being defined by an inner surface having a first clamping portion adjacent the first end face, the first end face having an axially facing wheel contact surface near the central opening and a protrusion outwardly adjacent the wheel contact surface, the protrusion having an inwardly facing surface defining a second clamping portion, and the second end face having a first flange contact surface spaced radially outward from the wheel contact surfaces and a second flange contact surface spaced radially inward from the first flange contact surface, and the impeller wheel comprising a rotatable body having a central opening for receiving the shaft, ring engaging means adjacent one end of the opening for engaging the lock ring, the ring engaging means including an axial end surface and an adjacent outwardly facing peripheral surface, and means at an opposite end of the opening for engagement by the fastening means, whereby in assembly the lock ring is flexed with the inner surface surrounding the shaft mounting portion, the first flange contact surface engaging the flange member, the wheel contact surface engaging the axial end surface of the wheel and the first and second clamping portions clampingly engaging the mounting portion of the shaft and the peripheral surface of the wheel, respectively, thereby locking the wheel end surface in a fixed position on the shaft.

16. A turbocharger impeller wheel as in claim 15 wherein the wheel axial end surface and outwardly facing peripheral surface are disposed on an annular portion.

17. A turbocharger impeller wheel as in claim 15 wherein the wheel includes drive means engageable with mating drive means on the shaft for rotating the wheel and shaft together.

18. A turbocharger impeller wheel as in claim 17 wherein the drive means are splines and further comprising an aluminum body having a tubular steel insert including a set of the splines, the insert incorporating the axial end surface and outwardly facing peripheral surface.

19. A turbocharger impeller wheel as in claim 17 and further comprising a non-ferrous body having a ferrous insert fixed on an end distal from the axial end surface, the insert including the wheel drive means.

20. A turbocharger impeller wheel as in claim 19 wherein the drive means is a polygonal opening.

21. A turbocharger impeller wheel as in claim 19 wherein the ferrous insert is drivingly secured to the non-ferrous body by shear pins sized to shear and allow relative rotation of the wheel on the shaft prior to reaching a wheel torque sufficient to yieldingly deform the associated shaft.

22. A turbocharger impeller wheel as in claim 19 wherein the non-ferrous body is titanium.

23. A turbocharger impeller wheel for use in a turbocharger having a shaft with an end, a shoulder spaced from the end and a mounting portion between the shoulder and the end, the wheel having an axial end surface and adapted to be mounted on the shaft mounting portion with the axial end surface in fixed opposed relation to the shoulder, a fastener on the shaft end and engaging the wheel to retain it on the shaft, wherein the wheel comprises a main body with a drive insert received in an end of the body distal from said axial end surface, the insert being spaced from said end surface and including drive means engagable with mating drive means on the shaft for rotating the insert and shaft together, and connecting means rotatably connecting the insert with the main body for driving the body and insert together.

24. A turbocharger impeller wheel as in claim 23 wherein the connecting means are shear pins sized to shear and allow relative rotation of the wheel on the shaft prior to reaching a torque sufficient to yieldingly deform the shaft.

25. A turbocharger impeller wheel as in claim 23 wherein the drive means is a polygonal opening.

26. A turbocharger impeller wheel as in claim 23 wherein the insert includes a plurality of blind holes opening to an outer surface of the insert to optionally receive weights for balancing.

27. A turbocharger impeller rotor having a shaft with an end, a wheel mounted on the shaft adjacent the end, a fastener on the shaft end and engaging the wheel to retain it on the shaft, the fastener being retained by axially centered threads on the shaft and engaging a tapered nose portion of the wheel, a nose cone having internal threads received on the shaft threads to retain the nose cone on the rotor, and a screw retained in a threaded axial opening in the shaft end and engaging the nose cone, the screw having a finer thread than the shaft to lock the nose cone against loosening rotation and prevent removal of the nose cone without first loosening the screw.

* * * * *